(12) United States Patent
Tomida et al.

(10) Patent No.: US 6,400,405 B2
(45) Date of Patent: Jun. 4, 2002

(54) APPARATUS FOR WATCHING AROUND VEHICLE

(75) Inventors: Takayuki Tomida; Jun Okada; Tomoyuki Mishima, all of Nagoya (JP)

(73) Assignees: Autonetworks Technologies, Ltd., Nagoya; Sumitomo Wiring Systems, Ltd., Yokkaich; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/796,485

(22) Filed: Mar. 2, 2001

(30) Foreign Application Priority Data

| | | |
|---|---|---|
| Mar. 2, 2000 | (JP) | 2000-056873 |
| Mar. 14, 2000 | (JP) | 2000-070309 |
| May 1, 2000 | (JP) | 2000-132135 |

(51) Int. Cl.[7] .............................................. H04N 5/222
(52) U.S. Cl. .................. 348/333.05; 348/118; 348/148; 348/333.01
(58) Field of Search ................................ 348/115, 118, 348/148, 149, 207, 333.01, 333.05, 372; 345/781, 792, 626, 629, 632

(56) References Cited

U.S. PATENT DOCUMENTS 5,646,614 A * 7/1997 Abersfelder et al. ..... 340/932.2
5,793,308 A * 8/1998 Rosinkski et al. .......... 340/903
5,796,350 A * 8/1998 Fuse ..................... 340/815.75

FOREIGN PATENT DOCUMENTS

| JP | 10104765 A | * | 4/1998 |
| JP | 10-104765 A |   | 4/1998 |
| JP | 2000222697 A | * | 8/2000 |

* cited by examiner

*Primary Examiner*—Wendy R. Garber
*Assistant Examiner*—Jason Whipkey
(74) *Attorney, Agent, or Firm*—Oliff & Berridge, PLC

(57) ABSTRACT

An apparatus for watching around a vehicle comprises an image pick-up unit 3 mounted on the exterior of a vehicle and a display unit 4 provided within the vehicle and used for displaying left and right images of the surrounding of the vehicle thus picked up by the image pick-up unit 3 together with a mask image 16 for dividing the surrounding image into the left and right images. In this case, two kinds of display colors including black and blew may be provided to the mask image 16. Further a photodiode 7 for detecting lightness outside the vehicle is provided. In a case where the luminous intensity outside the vehicle is decided to be high by a luminous intensity signal detected by the photodiode 7, a dark mask image 16 is displayed on the display unit 4, whereas when the luminous intensity outside the vehicle is decided to be low thereby, a light blew mask image 16 is displayed thereon.

11 Claims, 8 Drawing Sheets

APPARATUS FOR WATCHING AROUND VEHICLE

BACKGROUND OF THE INVENTION

1. Field of the Invention

The present invention relates to an apparatus for watching around a vehicle and more particularly to an apparatus for allowing a driver within a vehicle such as an automobile to observe scenes and the like on both left and right sides of the vehicle.

The present invention also relates to an apparatus for watching around a vehicle by picking up an image in a dead angle area around the vehicle in order to display the image within the vehicle.

2. Description of the Related Art

When an automobile approaches an intersection, it will be necessary for a driver to ensure safety on left and right sides. At any intersection offering poor lateral visibility, however, the driver has had to cause the vehicle to enter the intersection zone a little bit so as to make sure of safety on left and right sides. At that time, the driver needs to pay careful attention to moving the vehicle into the intersection zone and also making sure of safety by directly watching scenes on both the left and right sides after entering the intersection zone, which has mentally given the driver a burden.

In order to reduce the aforementioned burden, there has recently been proposed a visual observation apparatus in such a system as to mount an image pick-up unit on the hood, front grill and bumper of an automobile and by using the image pick-up unit to take in scenes on left and right sides of the vehicle so that images about left and right sides thereof may simultaneously be displayed on a display unit provided within the vehicle.

Moreover, there has also appeared an apparatus for displaying a mask image that is divided into left and right images in order to improve the discriminability between the left and right images in a case where the left and right images are simultaneously displayed on the display unit.

The masking systems disclosed in JP-A-10-104765 have adopted as what marks off the left image from the right one by compounding each of the left and right images and a window type mask using a trimming image and as what limits a range of pick-up visual fields corresponding to the mask position. The mask area of a mask image has heretofore been displayed in a single color such as black.

In such a case that the mask area is displayed in a dark color of black or the like, the drawback is poor visibility in that though the boundary between the left and right images and the mask image is distinctly recognized because the left and right images are brightly displayed in the daytime time zone, a dark portion (black portion) of each of the left and right images becomes greater in a time zone where the outside of the vehicle is dark and this makes it difficult to clearly recognize the boundary between the left and right images and the mask image.

In addition, it will be unnecessary to display both the left and right sides by means of any display device during normal cruising other than, for example, entering any intersection providing poor lateral visibility. In order to reduce power consumption, there has also been proposed an apparatus for stopping the supply of power to power supply circuits and image output circuits of the image pick-up unit such as CCD cameras whenever the vehicle travel speed, or the vehicle speed exceeds a predetermined level.

In the conventional apparatus for watching around a vehicle, however, electric power is supplied simultaneously to the power supply switch of an image pick-up means such as a CCD camera and an image output circuit in cases where the vehicle is traveling at a predetermined speed or lower, which results in taking a certain time to start the power supply within the image pick-up unit such as a CCD camera and to initialize an internal microcomputer and an LSI; namely, taking as long as about one second. During this time, the operation of an image signal tends to become unstable and as a normal signal is not output, a noise image is displayed in a display unit. The shortcoming is that display quality is deteriorated.

By the way, an apparatus for watching around a vehicle of the sort mentioned above is used to watch around a vehicle by causing images around the vehicle to be displayed during the travel of the vehicle on narrow streets offering poor visibility. However, the display of such images becomes unnecessary during the travel of the vehicle offering unobstructed view. Therefore, it is needed to switch the on and off states of displaying images around the vehicle by the apparatus for watching around a vehicle.

Consequently, an operating switch for switching the on and off states of the display of images around a vehicle is provided in the prior art to such an apparatus for watching around a vehicle so that a driver may operate the switch (first prior art).

Further, information on spots with poor visibility is included in car navigation maps to allow an apparatus for watching around a vehicle to decide whether the display of images around a vehicle will be needed on the basis of positional information indicating the present position of the vehicle by means of the information on spots with poor visibility, GPS and the like, whereby switching the on and off states of image display can be conducted automatically (second prior art).

However, the first prior art develops a problem arising from troublesome operation of switching the on and off states of the display of images around the vehicle.

With respect to the second prior art, though switching the on and off states of the display of images around the vehicle is automatically conducted, information on spots with poor visibility is needed to be included in the map information. Moreover, the problem is that an expensive system is also needed to detect the present position of the vehicle with precision in order to precisely decide whether or not the display of peripheral images will be needed, which results in increasing equipment cost.

SUMMARY OF THE INVENTION

It is therefore an object of the present invention to provide an apparatus for watching around a vehicle so designed to improve the visibility of the boundary between picked-up images and a mask image.

Another object of the present invention is to provide an apparatus for watching around a vehicle by effectively preventing a noise image from being displayed on a display unit in order to improve display quality at the same time.

Still another object of the present invention is to provide a low-cost apparatus for watching around a vehicle capable of switching the on and off states of the display of images around a vehicle precisely and automatically depending on the visibility around the vehicle.

To technically solve the foregoing problems, there is provided an apparatus for watching around a vehicle according to the invention using an image pick-up unit to be mounted on the exterior of the vehicle to pick up images of the surroundings of the vehicle so that the images thus picked up thereby together with a mask image which is superimposed on the picked-up images can be displayed on a display unit provided within the vehicle, which is characterized in that the apparatus for watching around the vehicle includes a light-to-dark decision unit for deciding the lightness outside the vehicle; the display color of the mask image is switchable from one to another; and the display color of the mask image is set switchable from one to another according to a light-to-dark decision signal from the light-to-dark decision unit.

The apparatus for watching around a vehicle functions as what picks up both left and right surroundings of the vehicle, causing the left and right images thus picked up to be displayed on the display unit separately or simultaneously, and also displaying the mask image in a manner specifying the left or right image.

In the apparatus for watching around a vehicle, a plurality of colors including light and dark colors are provided as the display color of the mask image, and the display color of the mask image may be switched to the dark color when the luminous intensity outside the vehicle is decided to be high through the light-to-dark decision signal, and to the light color when the luminous intensity outside the vehicle is decided to be low therethrough.

In the apparatus for watching around a vehicle, the light-to-dark decision unit has a lamp lighting circuit mounted on the vehicle, and the light-to-dark decision signal includes a light-on and a light-off signal of the lamp lighting circuit, thereby to switch the display colors of the mask image when the luminous intensity outside the vehicle is decided to be high by the light-off signal or when the luminous intensity outside the vehicle is decided to be low by the light-on signal.

A means of technically solving the foregoing problems by an apparatus for watching around a vehicle using an image pick-up element to be mounted in the vehicle to pick up images on both the left and right sides of the surroundings of the vehicle and displaying the left and right images thus picked up on a display unit provided within the vehicle via an image control unit, wherein the image control unit may comprise an image pick-up element power switch for turning on and off the operating circuit of the image pick-up element, an image output signal switch for turning on and off an image output circuit for subjecting an image signal picked up by the image pick-up element to a conversion process and supplying the converted image signal, and a switch control portion having the upper threshold speed of vehicle speed for turning on and off the image pick-up element power switch and a lower threshold speed of the vehicle speed for turning on and off the image output signal switch and wherein the image pick-up element power switch may be turned on by the switch control portion when it is detected that the vehicle speed reaches the upper threshold speed during the time of speed reduction and the image output signal switch is turned on by the switch control portion when it is detected that the vehicle speed reaches the lower threshold speed during the time of speed reduction.

An apparatus for watching around a vehicle may be such that the image pick-up element power switch as well as the image output signal switch is turned off by the switch control portion when it is detected that the vehicle speed reaches the lower threshold speed.

An apparatus for watching around a vehicle may be such that the image control unit includes a display unit power switch for turning on and off the operating circuit of the display unit, wherein the display unit power switch and the image pick-up element power switch are turned on and off in synchronization with each other by the switch control portion.

In order to technically accomplish the object above, an apparatus for watching around a vehicle by picking up images of dead angle areas around the vehicle to display the images within the vehicle, comprises: an image pick-up unit for picking up images of dead angle areas around the vehicle; a display unit for displaying the images picked up by the image pick-up unit; a distance measuring unit for detecting the distance between the vehicle and an obstacle so positioned as to obstruct the view of a driver on at least one side out of both sides of the vehicle during the travel of the vehicle; and a controller for deciding whether or not the display of the image on the display unit will be needed on the basis of the distance detected by the distance measuring unit and controlling the display unit over switching the on and off states of display according to the decision made thereby.

Preferably, the apparatus for watching around a vehicle is such that the distance measuring unit detects the distance between the vehicle and each of the obstacles positioned on both the left and right sides of the vehicle during the travel of the vehicle; and the controller detects a space between the left- and right-hand obstacles on the basis of the distance between the vehicle and each of the left- and right-hand obstacles detected by the distance measuring unit, regards the space as width of a road on which the vehicle is traveling, decides whether or not the display of the image on the display unit will be needed on the basis of the value of the width thereof, and controls the display unit over switching the on and off states of display according to the decision made thereby.

Preferably, the apparatus for watching around a vehicle further comprises a travel-condition detector for accepting at least one vehicle signal for making reduced vehicle speed detectable out of vehicle signals indicating travel conditions which are output from a plurality of vehicle portions, and detecting the reduced vehicle speed according to the one vehicle signal, wherein the controller decides whether or not the display of the image on the display unit will be needed on the basis of the width of the road detected by the distance measuring unit and the result detected by the travel-condition detector, and controls the display unit over switching the on and off states of display according to the decision made thereby.

Preferably, the apparatus for watching around a vehicle further comprises a travel-condition detector for detecting vehicle speed by accepting a vehicle signal indicating vehicle speed, wherein the controller decides that the display of the image by the display unit will be needed only in case where the width of the road detected by the distance measuring unit is equal to a predetermined reference distance or less and where the vehicle speed detected by the travel-condition detector is a predetermined reference speed or lower, and causes the image to be displayed on the display unit.

Preferably, the apparatus for watching around a vehicle is such that the image pick-up unit is installed in the front end portion of the vehicle and used to pick up images in left and right directions in front of the vehicle.

DETAILED DESCRIPTION OF THE PRESENT INVENTION

The present invention will be described in detail with reference to the accompanying drawings.

First Embodiment

Figure 1:
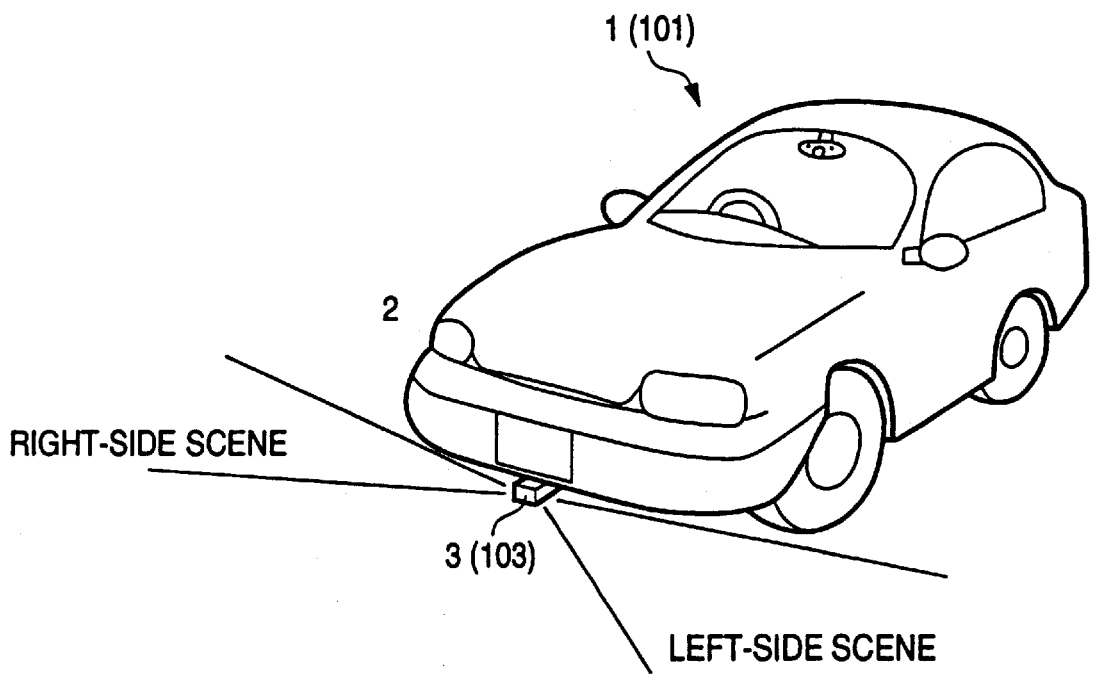
FIG. 1 is an external perspective view of an apparatus for watching around a vehicle applied to an automobile according to a first embodiment of the invention.
Figure 2:
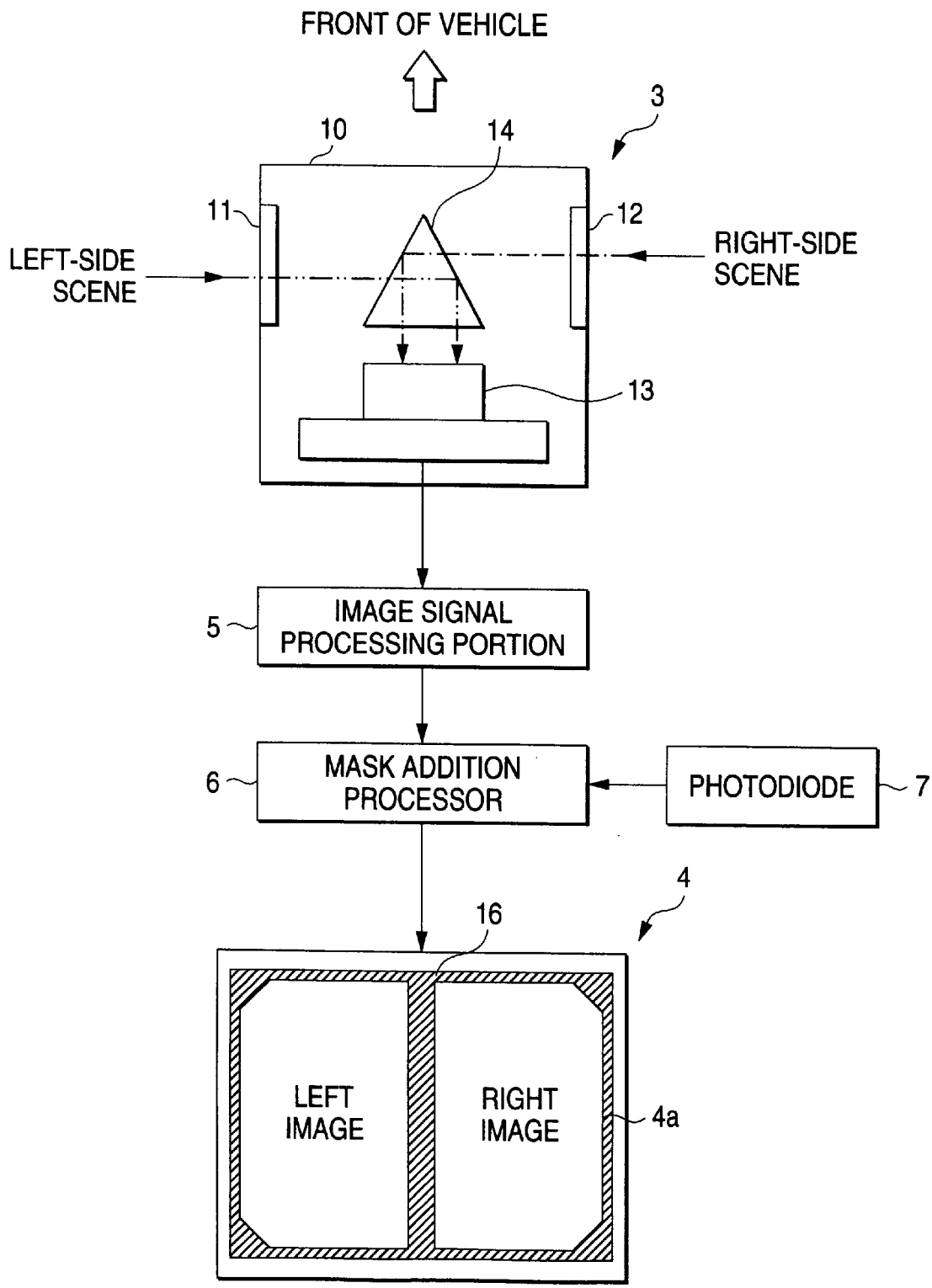
FIG. 2 is an overall block diagram descriptive of the whole apparatus for watching around the vehicle above.

A first embodiment of the present invention will be described with reference to the drawings. As shown in FIGS. 1 and 2, an apparatus for watching around an automobile as a vehicle, for example, comprises an image pick-up unit 3 installed beneath a front bumper or the like, a display unit 4 formed with an LCD (Liquid Crystal Display), a CRT or the like provided in a position on an instrument panel or the like within the vehicle where it is easily visible to a driver, an image signal processing portion 5 for converting the image signal picked up by the image pick-up unit 3 to a predetermined display signal and supplying to the display unit 4 the display signal, a mask addition processor 6 for adding (so-called superimposing) a predetermined mask image 16 by the image signal processing portion 5 onto the display signal and supplying the mask image 16 to the display unit 4, and a photodiode 7 as a light-to-darkness decision unit for detecting the luminous intensity outside the vehicle.

The image pick-up unit 3 includes a rectangular case body 10 extending along the longitudinal direction of the automobile 1, a pair of lateral transmission windows 11 and 12 of transparent glass fitted to the rectangular opening formed and positioned on both the respective front side openings of the case body 10, a CCD camera 13 as a single image pick-up portion disposed in the case body 10, and a prism body 14 for guiding light onto the image pick-up surface of the CCD camera 13 by reflecting the light introduced through the transmission windows 11 and 12.

As shown in FIG. 2, light entering from the left transmission window 11 is reflected by the prism body 14 and guided to the right half of the image puck-up surface of the CCD camera 13, whereas light entering from the right transmission window 12 is reflected by the prism body 14 and guided to the left half of the image pick-up surface of the CCD camera 13, so that both the left and right scenes are simultaneously picked up by the single CCD camera 13.

The image signal picked up by the CCD camera 13 is subjected to a mirror image inversion process in the image signal processing portion 5 and supplied to the display unit 4. During the supply of thus processed image signal from the image signal processing portion 5 to the display unit 4, further, the predetermined mask image 16 is added thereto in the mask addition processor 16 and supplied to the display unit 4. In outer peripheral and central portions in the display portion 4a of the display unit 4, the window frame type mask image 16 is displayed. The right-hand side scene picked up through the transmission window 12 is displayed in the right frame of the mask image 16, whereas the left-hand side scene picked up through the transmission window 11 is displayed in the left frame of the mask image 16. In this case the left and right images are displayed on the right and left sides of the display unit 4 by the display unit 4.

The mask addition processor 6 supports two kinds of display colors including blue as a light display color to be added to the mask image 16 and black as a dark display color to be added thereto. These colors are so controlled that they are switched according to a brightness signal as a light-to-darkness decision signal from the photodiode 7.

A predetermined threshold value has been set as the brightness signal, for example, and in a case where the brightness signal has a threshold value or greater, the black color is added to the mask image 16. In a case where the brightness signal has a threshold value less than the threshold value, that is, the outside of the vehicle is dark and has not predetermined lightness, the light blue color is added to the mask image 16.

The apparatus for watching around the automobile 1 is arranged so that the left and right scenes may simultaneously be taken in at an intersection offering poor lateral visibility from each of the transmission windows 11 and 12 of the image pick-up unit 3 by causing only the front bumper 2 of the front end portion of the automobile 1 to enter the intersection. As the scene divided into the left and right images is displayed on the display portion 4a of the display unit 4 within the vehicle, the driver is allowed to readily confirm the safety on both left and right sides at the intersection by looking at the display portion 4a.

At this time, the mask image 16 is provided with a plurality of display colors including blue and black. Then the photodiode 7 detects the lightness whereby to have a black mask image 16 added and displayed while the ambience is light in the daytime and to have a blue mask image 16 added and displayed while the ambience is dark at night. Consequently, irrespective of lightness outside the vehicle, the boundary between the picked-up left and right images and the mask image 16 is clearly recognized and this makes it possible to specifically distinguish between the left and right images. Thus, the visibility is improved.

Although the mask image 16 of a two-stage switching structure including two kinds of black and blue display colors has been referred to according to this embodiment of the invention, a system of automatically switching more than two stages with multicolors including various light and dark colors to be displayed on the mask image 16 depending on the outside luminous intensity may be adopted. Further, any system of successively changing the brightness of the mask image 16 depending on the outside luminous intensity may also be adopted. In these cases, a display color of the dark color system may be employed while the luminous intensity outside the vehicle is high, whereas a display color of the light color system may be employed while the luminous intensity outside the vehicle is low.

Although blue and black have been employed as the light color and dark color respectively, the invention is not limited to these colors but may be adapted to use any one of the display colors as long as the visibility is secured depending on the lightness outside the vehicle.

Although the invention is so configured as to have the photodiode 7 as a light-to-dark decision unit for detecting the lightness outside the vehicle, any one of the luminous intensity detecting unit may be employed.

Second Embodiment

Figure 3:
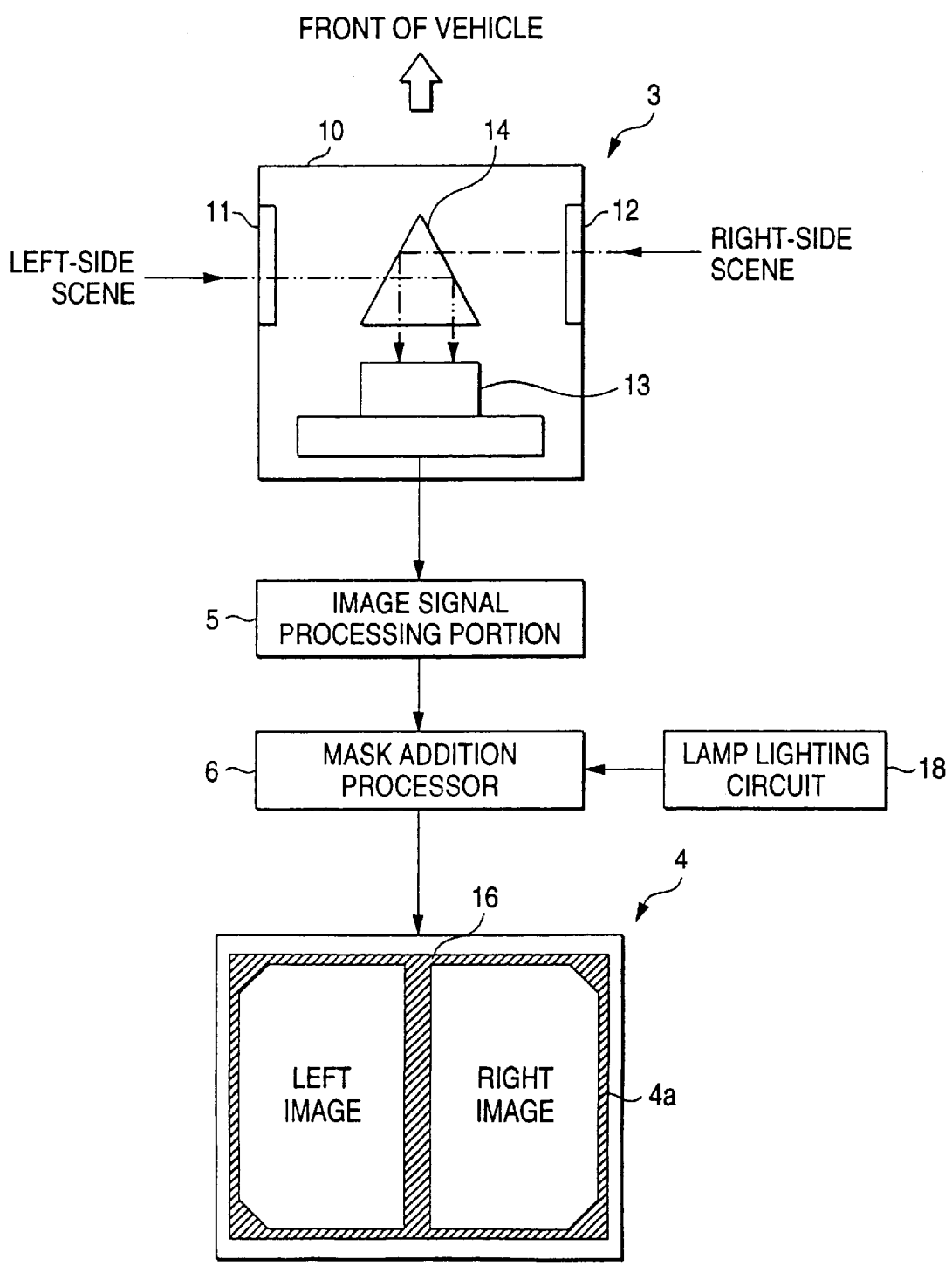
FIG. 3 is an overall block diagram descriptive of an apparatus for watching around a vehicle according to a second embodiment of the invention.

FIG. 3 shows a second embodiment of the invention, wherein like reference characters designate like components in the first embodiment thereof.

The second embodiment of the invention is so configured as to utilize a lamp lighting circuit 18 for a headlamp and a small lamp mounted on a vehicle in place of the photodiode 7 according to the first embodiment of the invention as the light-to-darkness decision unit for detecting the lightness outside the vehicle. In this case, ON/OFF of the lamp in the lamp lighting circuit 18, that is, a lamp-on or a lamp-off signal is used as the light-to-dark decision signal. The mask image 16 having the two kinds of blue and black display colors respectively as light and dark colors is so controlled as to switch the lamp-on and lamp-off signals.

According to the second embodiment of the invention, the black mask image 16 is added in a case where a signal from the lamp lighting circuit 18 is the light-off signal, that is, the outside of the vehicle has a predetermined lightness or greater as in the daytime and the lighting of the lamp is decided to be unnecessary. On the other hand, the light blue mask image 16 is added in a case where a signal from the lamp lighting circuit 18 is the light-on signal, that is, the outside of the vehicle is dark enough not to reach the predetermined lightness at night and the lighting of the lamp is decided to be necessary.

With the second embodiment of the invention thus arranged, the system of automatically switching the display colors of the mask image 16 according to whether the light-or light-off signal sent from the lamp lighting circuit 18 is like this. The black mask image 16 is added and displayed in the daytime when the lighting of the lamp is unnecessary, whereas the light blue display color is added and displayed at night when the lighting of the lamp is necessary. Thus, irrespective of lightness outside the vehicle, the boundary between the picked-up left and right images and the mask image 16 is clearly recognized and this contributes to improving the visibility.

The second embodiment of the invention is advantageous in that the lamp lighting circuit 18 installed in the vehicle is utilized without specially providing any photodiode 7, thus making the structure of the apparatus for watching around the vehicle can be simplified.

Incidentally, though the image pick-up unit 3 is installed in the front portion of the vehicle, it may be installed in the rear of the vehicle.

Although the mask area of the mask image 16 has been formed like a window frame, it may be so configure as to provide left and right partitioned areas existing in the at least central portion even though any mask area does not exit along the outer periphery of each of the left and right images.

Further, though each of the embodiments of the invention teaches a structure wherein a so-called window frame type mask area to be synthesized into and displayed on the display unit 4 as the superimposed mask image 16, the picked-up left and right images may be displayed separately. At this time, the superimposed image 16 may be displayed with discriminating characters of (L) and (R) respectively designating left and right for specifying the left and right sides. Even in this case, the image individually displayed can be recognized as the right-side image or left-side one.

Moreover, though the single CCD camera 13 has been used to pick up images on both the left and right sides of the vehicle, pick-up unit for separately picking up left and right scenes may be provided.

Third Embodiment

Figure 4:
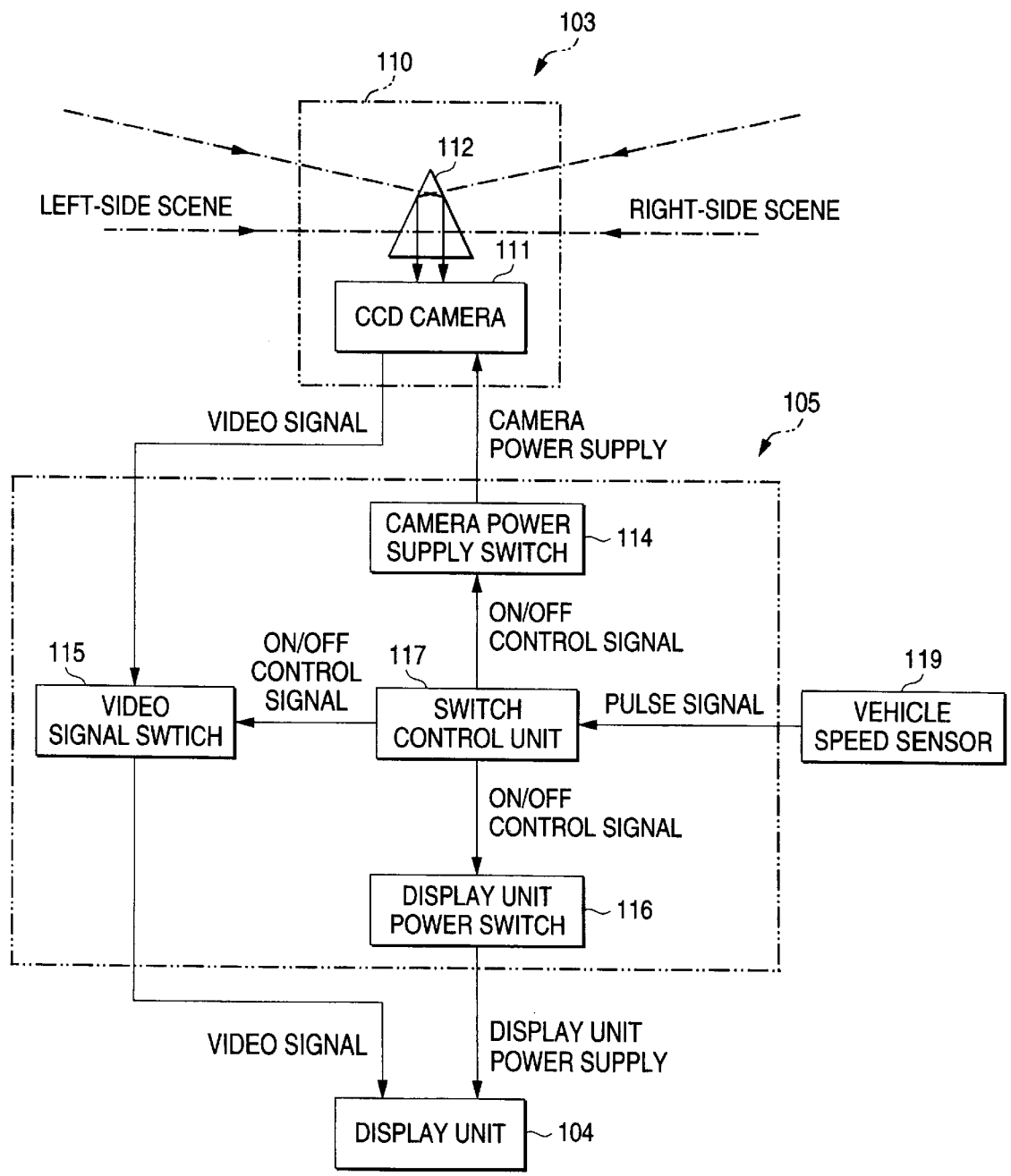
FIG. 4 is a block diagram of an overall system embodying the invention.

A third embodiment of the present invention will be described with reference to the drawings. As shown in FIGS. 1 and 4, an apparatus for watching around an automobile as a vehicle, for example, comprises a camera unit 103 as an image pick-up unit installed beneath a front bumper or the like, a display unit 104 formed with an LCD, a CRT or the like provided in a position on an instrument panel or the like with the vehicle where it is easily visible to a driver, and an image control unit 105 for subjecting the image pick-up signal in the camera unit 103 to a conversion process and supplying the converted signal to the display unit 104.

The camera unit 103 includes a rectangular case body 110 extending along the longitudinal direction of the automobile 101, a pair of lateral transmission windows 111 and 112 of transparent glass fitted to the rectangular opening formed and positioned on both the respective front side openings of the case body 110, a CCD camera 111 as a single image pick-up element disposed in the case body 110, and a prism body 112 for guiding light onto the image pick-up surface of the CCD camera 111 by reflecting the light introduced through the transmission windows 111 and 112.

As shown in FIG. 4, light entering from the left transmission window 11 is reflected by the prism body 112 and guided to the right half of the image puck-up surface of the CCD camera 111, whereas light entering from the right transmission window 112 is reflected by the prism body 112 and guided to the left half of the image pick-up surface of the CCD camera 111, so that both the left and right scenes are simultaneously picked up by the single CCD camera 111.

The imagepick-up signal from the CCD camera 111 is subjected to a mirror image inversion process in the image control unit 105 and supplied to the display unit 104. The right-hand side scene picked up through the right transmission window is displayed in the right half portion of the display unit 104 as a right image, whereas the left-hand side scene picked up through the left transmission window is displayed in the left half portion thereof.

The image control unit 105 includes a camera power switch 114 as the image pick-up element power switch for turning on and off the actuating circuit of the CCD camera 111, a video signal switch 115 as the image output signal switch for subjecting the image pick-up signal to a predetermined converting process and supplying the converted signal to the display unit 104 as video signal, a display unit power switch 116 for turning on and off the actuating circuit of the display unit 104, and a switch control portion 117 for controlling the on and off of the camera power switch 114, and the video signal switch 115 and the display unit power switch 116.

In the switch control portion 117, there are set an upper threshold speed Va of the vehicle speed for controlling the on and off in synchronization with the on and off of the camera power switch 114, and a lower threshold speed Vb of the vehicle speed for controlling the on and off of the video signal switch 115; in this case, Va>Vb. The upper and lower threshold values Va and Vb may be set at 20 km/h and 10 km/h, respectively, on the assumption that while it takes one second or greater to reduce the vehicle speed from 20 km/h up to 10 km/h during traveling in an urban area, the operation of starting the CCD camera 111 as well as the display unit 104 is sufficiently stably performable within that time.

The switch control portion 117 also functions as what decides whether the vehicle speed will be increased or decreased by detecting a pulse signal corresponding to the vehicle speed via a vehicle speed sensor 119 of the vehicle and calculating the vehicle speed from the period of the signal.

A description will be given of the operation of the switch control portion 117 when the vehicle speed is reduced as it is coming near to the intersection with reference to a flowchart of FIG. 5.

First, it is decided whether or not the present vehicle speed will be higher than the upper threshold speed Va (Step S1). In case where the former is higher than the latter, Step S2 is followed. Then the camera power switch 114, the video signal switch 115 and the display unit power switch 116 are held OFF.

The vehicle speed is reduced further and when vehicle speed V reaches the upper threshold speed Va or lower, Step S3 is followed and an ON control signal is applied from the switch control portion 117 to each of the camera power switch 114 and the display unit power switch 116. The camera power switch 114 and the display unit power switch 116 are controlled so that both may be turned on in synchronization with each other. At this time the video signals witch 115 are held OFF. Consequently, the video signals of the left and right images picked up by the CCD camera 111 are not applied to the display unit 104 at this time, whereupon no images are displayed on the display unit 104.

Then Step S4 is followed and whether or not the vehicle speed V will be higher than the lower threshold speed Vb is decided and in case where the former is higher than the latter, Step S3 is followed again.

In case where the vehicle speed V is reduced further to the lower threshold speed Vb or lower, Step S5 is followed and while the camera power switch 114 and the display unit power switch 116 are both held ON, the ON control signal is applied from the switch control portion 117 to the video signal switch 115, whereby the video signal switch 115 is turned on. In this case, the video signals of the left and right images are applied to the display unit 104 and the left and right images are simultaneously display on the display unit 104. As the driver is allowed to confirm safety on the left and right sides within the intersection zone all at once by looking at the display portion of the display unit 104; thus, safety is easily confirmable.

The operation of the switch control portion 117 will be described with reference to a flowchart of FIG. 6 in case where a normal travel condition is restored by acceleration after the vehicle in the reduced speed condition passes through the intersection zone.

First, it is decided whether or not the present vehicle speed will be lower than the lower threshold speed Vb (Step S11). In case where the former is lower than the latter, Step S12 is followed. At step S12, the camera power switch 114, the video signal switch 115 and the display unit power switch 116 are held ON, so that the left and right images are being displayed.

The vehicle speed is increased further and when vehicle speed V reaches the upper threshold speed Va or higher, Step S13 is followed and an OFF control signal is applied from the switch control portion 117 to each of the display unit power switch 116 and the video signal switch 115. The camera power switch 114, the display unit power switch 116, and the video signal switch 115 are controlled so that they may be turned off in synchronization with one another. Then the display of the left and right images on the display unit 104 is stopped.

As described above, according to this embodiment of the invention, the vehicle speed is reduced from the normal travel condition to the upper threshold speed Va or lower, the power is supplied to turn on the CCD camera 111 and the display unit 104. After the passage of the predetermined time until the operation of the CCD camera 111 as well as the display unit 104 is stabilized, the video signal switch 115 is then turned on in this system. A noise image disturbance at the initial stage of the rise of the CCD camera 111 is effectively prevented from being displayed and display quality is made improvable.

When the display unit 104 is not needed to make display after the normal travel condition is restored by acceleration, the supply of power to the CCD camera 111 and the display unit 104 is totally stopped, whereby the power is supplied to the CCD camera 111 and the display unit 104 only during the time watching around the vehicle is needed. It is thus possible to implement power saving effectively.

Figure 7:
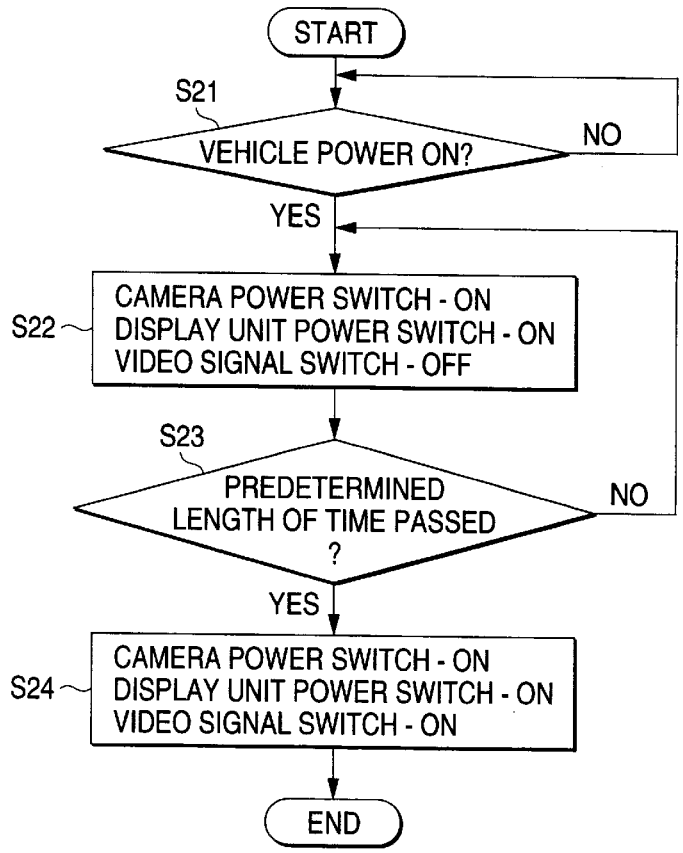
FIG. 7 is a flowchart showing the operation at the initial stage of starting.

FIG. 7 is a flowchart showing the rise of the peripheral watching unit when the engine of the automobile 101 is started, for example, in case where it is started from a garage. The vehicle power supply is turned on by pivoting an engine key from an OFF position to an ACC position (or the ON position) (Step S21) for shifting to Step S22. The ON control signal is applied from the switch control portion 117 to the camera power switch 114 and the display unit power switch 116 first. Then the camera power switch 114 and the display unit power switch 116 are controlled so that both are turn on in synchronization with each other. At this time, the video signal switch 115 is held OFF. Therefore, the video signals of the left and right images picked up by the CCD camera 111 are not applied to the display unit 104 and no images are displayed on the display unit 104.

Further, it is decided whether or not a preset fixed time (ex., about one second) necessary for stabilizing the operation of the CCD camera 111 and the display unit 104 is passed (Step S23). Upon the passage of the predetermined time, Step S24 is followed and after the camera power switch 114 and the display unit power switch are both turned on, the ON control signal is applied from the switch control portion 117 to the video signal switch 115 so as to hold ON the video signal switch 115. Then the video signals of the left and right signals picked up by the CCD camera 111 are applied to the display unit 104, so that the left and right images are simultaneously displayed on the display unit 104.

Figure 5:
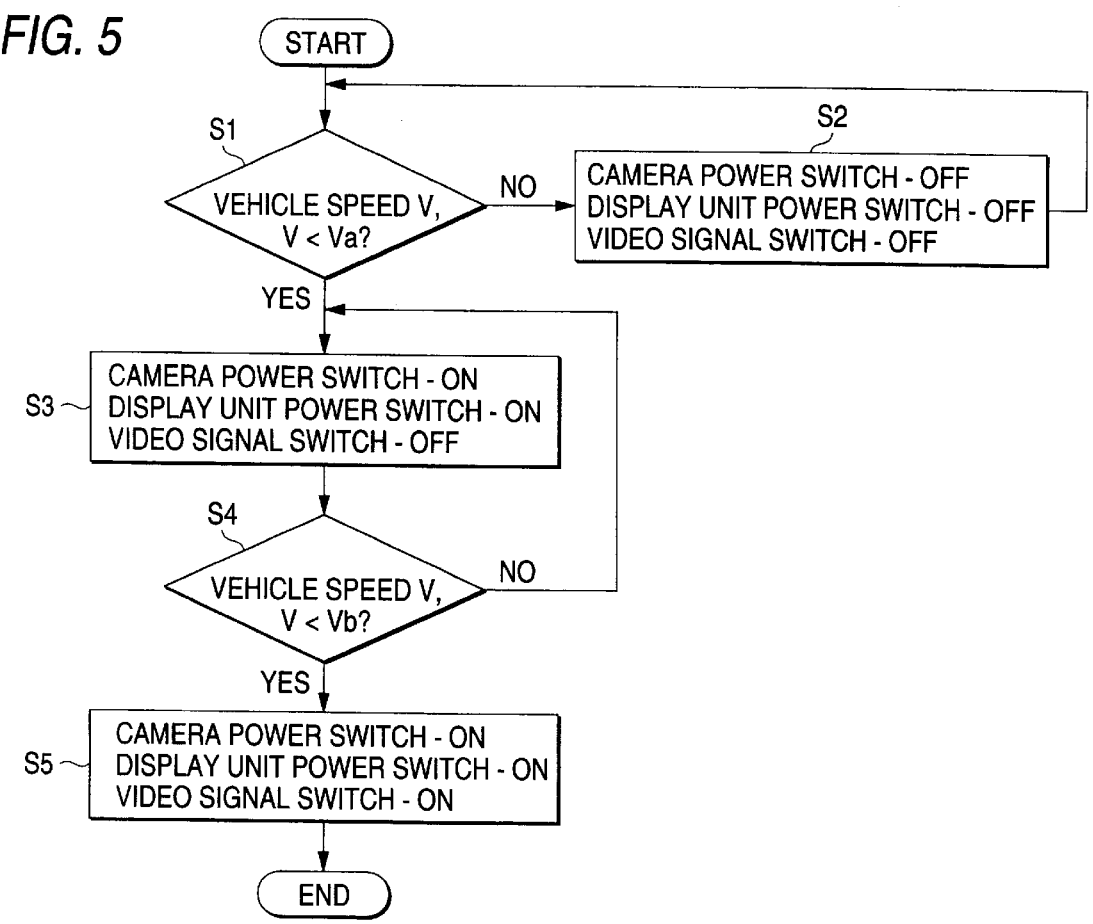
FIG. 5 is a flowchart showing the operation during speed reduction.
Figure 6:
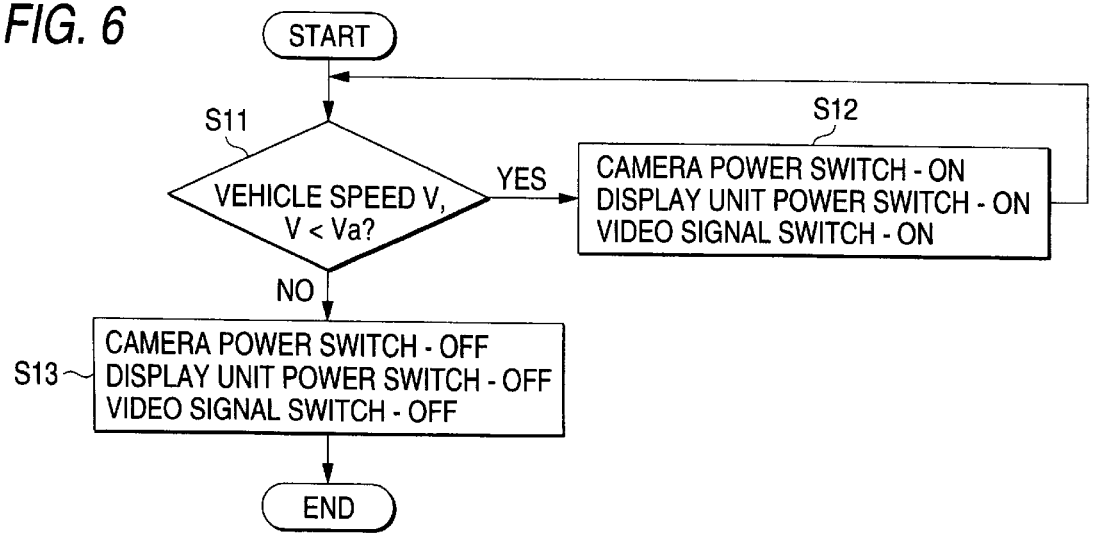
FIG. 6 is a flowchart showing the operation during speed acceleration.

During acceleration and deacceleration, the apparatus for watching around the vehicle is operated in accordance with the flowcharts shown in FIGS. 5 and 6.

Although a system of taking in the left and right images by the single camera unit has been shown according to this embodiment of the invention, a CCD camera 111 for taking in the left and right scenes of images may be so arranged as to be disposed on both left and right sides separately.

The upper and lower threshold speeds Va and Vb may properly be set in order to secure a time necessary for stabilizing the operation of the CCD camera 111 as well as the display unit 104.

Although an arrangement of turning on and off the CCD camera 111 and the display unit 104 is in synchronization with each other, the display unit 104 may be turned on and off independently. In this case, it is only needed to hold ON the display unit 104 beforehand. The rest of the operations may be performed as shown in FIGS. 5 and 6.

Fourth Embodiment

Figure 8:
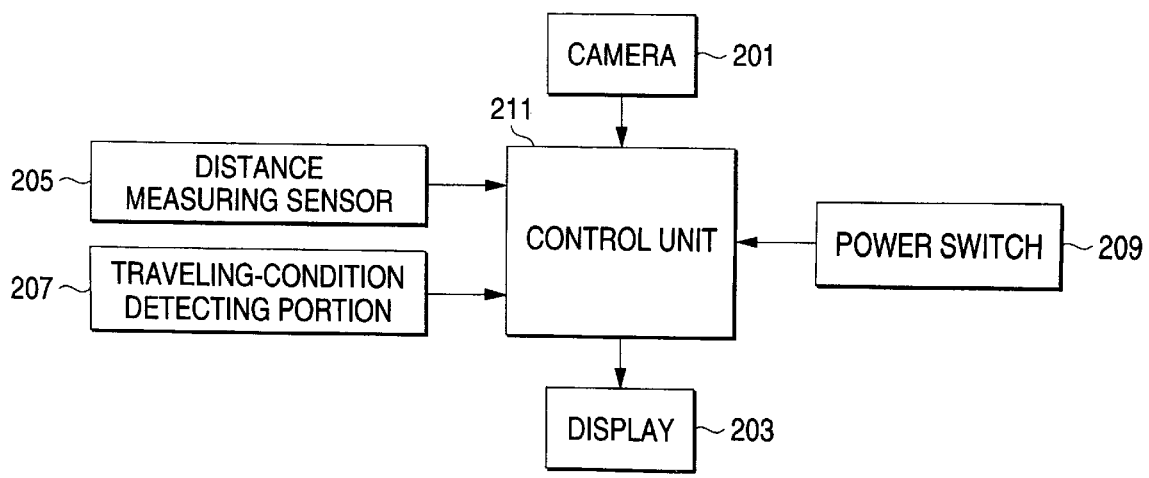
FIG. 8 is a block diagram showing the configuration of an apparatus for watching around a vehicle according to a fourth embodiment of the present invention.
Figure 9:
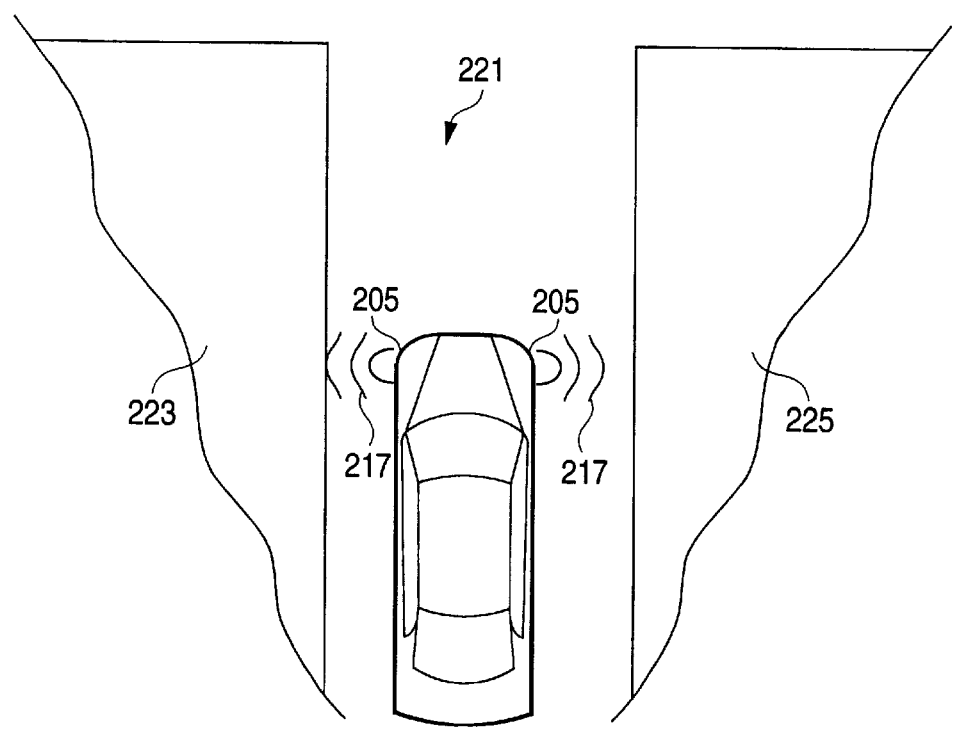
FIG. 9 is a diagram showing the travel-condition of a vehicle on a road with the apparatus for watching around a vehicle of FIG. 8.
Figure 10:
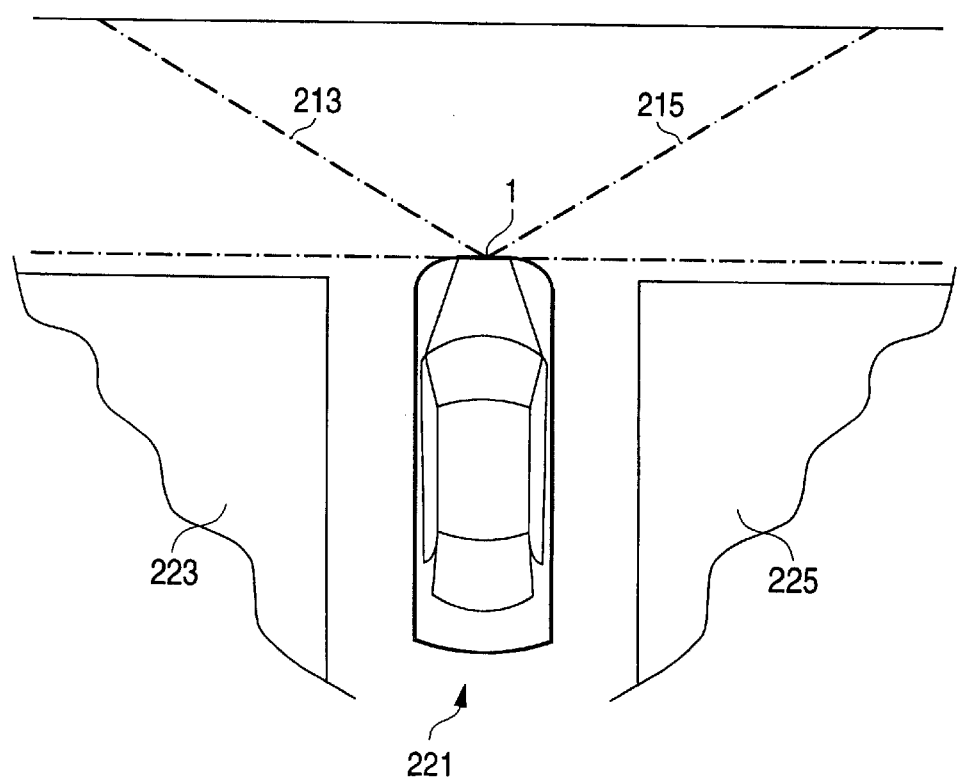
FIG. 10 is a diagram showing the travel-condition of a vehicle on a road with the apparatus for watching around a vehicle of FIG. 8.

FIG. 8 is a block diagram showing the configuration of an apparatus for watching around a vehicle according to a fourth embodiment of the present invention. FIGS. 9 and 10 are diagrams each showing the travel-condition of a vehicle on a road with the apparatus for watching around a vehicle of FIG. 8.

As shown in FIG. 8, the apparatus for watching around a vehicle comprises a camera (an image pick-up unit) 201, a display (a display unit) 203, a distance measuring sensor (a distance measuring unit) 205, a travel-condition detecting portion (a travel-condition detector) 207, a power switch 209, and a control unit (a controller) 211.

As shown in FIG. 10, the camera 201 is installed in the front end portion of the vehicle and used to pick up images in image pick-up areas (dead angle areas) 213 and 215 on the left and right sides in front of the vehicle. The display 203 is installed in a position visible to a driver in the vehicle and used to display the image picked up by the camera 201 or a car navigation image in case where the vehicle is equipped with a car navigation unit. The power switch 209 is a switch for turning on and off the apparatus for watching around a vehicle.

As shown in FIG. 9, the distance measuring sensor 205 is installed on both the left and right sides of the front end portion of the vehicle and used to detect not only the presence or absence of obstacles on both the left and right sides of a road 221 during the travel of the vehicle but also distances up to the respective obstacles 223 and 225 by means of a distance measuring signal (ultrasonic wave in this case) 217 under the control of the control unit 211. The distance measuring sensors 205 also supplies the detected results to the control unit 211.

More specifically, according to the fourth embodiment of the invention, the ultrasonic wave is used as a distance measuring signal 217. Each of the left and right distance measuring sensors 205 periodically transmits the ultrasonic wave 217 in the lateral directions of the vehicle and receives the reflected wave. Moreover, each of the left and right distance measuring sensors 205 also detects the presence or absence of the reflected wave and the passage of time from the transmission of the ultrasonic wave 217 up to the reception thereof, so that it detects not only the presence or absence of the obstacles 223 and 225 on the left and right sides of the road 221 during the travel of the vehicle but also the distances up to the respective obstacles 223 and 225. In this case, the obstacles 223 and 225 as objects for detection include those which are so erected as to obstruct the view of the driver such as buildings, walls and the like.

The travel-condition detecting portion 207 accepts at least one vehicle signal (e.g., vehicle speed signal or brake signal) out of the vehicle signals indicating the travel condition that is output from each portion of the vehicle (e.g., the presence of absence of the vehicle speed and the operation of the brake) and supplies the detected result to the control unit 211.

According to the fourth embodiment of the invention, the travel-condition detecting portion 207 is used for accepting a vehicle speed signal that is output from vehicle speed sensors (not shown) mounted in the vehicle, detecting the vehicle speed based on the vehicle speed signal and supplying the detected result to the control unit 211.

The control unit 211 decides whether or not the display of the image picked up by the camera 201 will be needed on the basis of the results detected by the distance measuring sensors 205 and the travel-condition detecting portion 207. The control unit 211 also functions as what causes the image picked up by the camera 201 to be displayed on the display 203 according to the decided results. Further, the control unit 211 causes any other image such as a navigation image or the like to be displayed on the display 203 as occasion demands unless the image picked up by the camera 201 is displayed on the display 203.

More specifically, in case where the control unit 211 detects via the distance measuring sensors 205 the presence of the obstacle 223 and 225 so positioned as to obstruct the view of the driver on both the left and right sides of the road 221 during the travel of the vehicle, it also detects the space between the obstacles 223 and 225 on both the left and right sides on the basis of the distance between the vehicle and each of the left and right obstacles 223 and 225 detected by the distance measuring sensor 205, the space being regarded as the width of a road during the travel of the vehicle. Only in case where the width of the road is equal to a predetermined reference distance or less and where the vehicle speed detected by the travel-condition detecting portion 207 is a predetermined reference speed (e.g., 10 km/h) or lower, the control unit 211 decides that the display of the image picked up by the camera 201 will be needed and turns on the display 203 so that the image picked up by the camera 201 may be displayed thereon.

Figure 11:
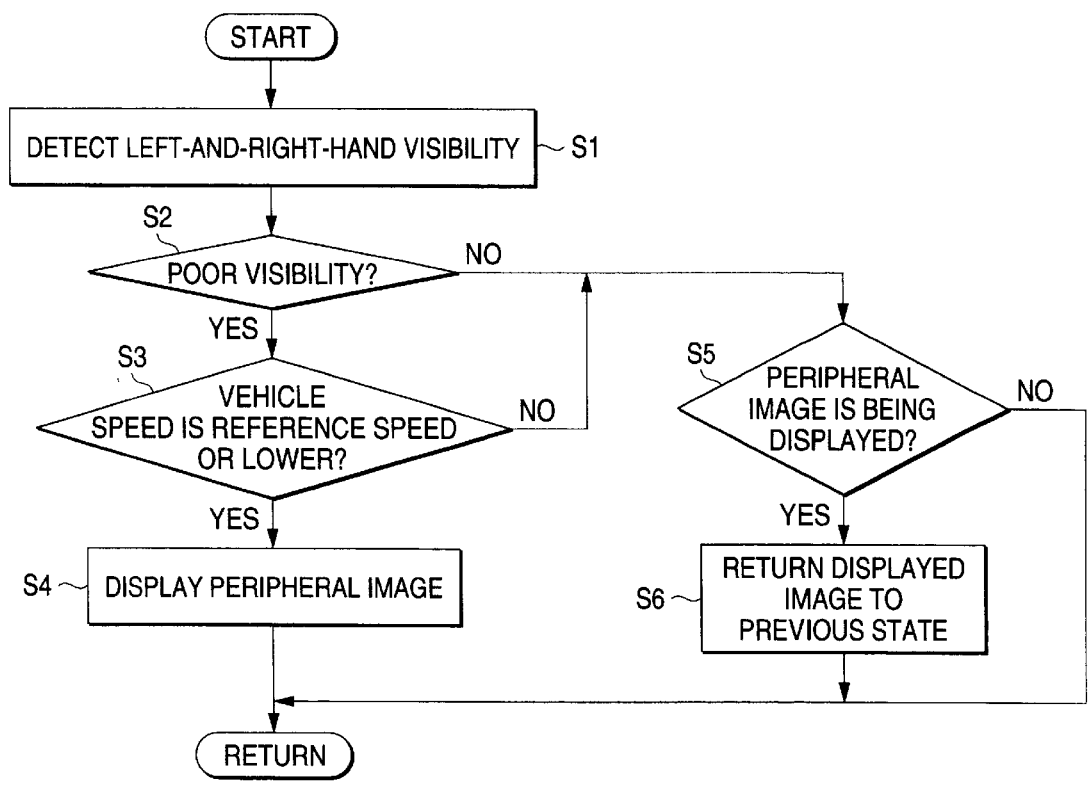
FIG. 11 is a flowchart showing the principal control contents of the control unit 211.

FIG. 11 is a flowchart (subroutine) showing the principal control contents of the control unit 211. At Step S1, a degree of unobstructed view on the left and right sides of the road 221 during the travel of the vehicle is detected via the distance measuring sensor 205 and then Step S2 is followed. At Step S1, the presence or absence of obstacles 223 and 225 so positioned as to obstruct the view of the driver on the left and right sides of the road 221 during the travel of the vehicle as well as the width of the road during the travel of the vehicle is detected via the distance measuring sensors 205.

At Step S2, it is decided whether a lateral vista of the road 221 is good or bad on the basis of the detected results at Step S1. In case where the results are bad, Step S3 is followed, whereas the results are not bad, the display of the image picked up by the camera 201 is decided to be unnecessary and Step S5 is followed.

More specifically, the obstacles 223 and 225 so positioned as to obstruct the view of the driver on the left and right sides of the road 221 during the travel of the vehicle exist at Step S3. In case where the space between the obstacles 223 and 225 (width of the road 221) has the predetermined reference distance or less, the field of vision is decided to be bad. In any other case (e.g., the obstacles 223 and 225 are nonexistent or even existent, the width of the road 221 has the predetermined reference distance or greater) the field of vision is decided to be good.

At Step S3, it is decided whether or not the vehicle speed will be the predetermined reference speed or lower on the basis of the result detected by the travel-condition detecting portion 207. In case where the vehicle speed is the reference speed or lower, the display of the image picked by the camera 201 on the display 203 is decided to be necessary and Step S4 is followed. In case where the vehicle speed is not the reference speed or lower, on the other hand, the display of the image picked up by the camera 201 on the display 203 is decided to be unnecessary and Step S5 is followed.

The reason for deciding whether or not the vehicle speed will be the reference speed or lower at Step S3 is as follows. Even in case where the road 221 offers poor visibility on the left and right sides during the travel of the vehicle, the vehicle speed is often set at the value of the reference speed or greater with respect the road 221 free from branching points such as crossroads and the like, and free from fear of colliding with any other vehicle coming from the left or right side thereof (i.e., the display of the image picked up by the camera 201 is unnecessary). On the contrary, in case where the road 221 is a narrow one offering poor visibility on the left and right side, and not free from fear of colliding with any vehicle coming from the left or right side thereof (i.e., the display of the image picked up by the camera 201 is necessary), the vehicle speed is often set at the reference speed or lower since the driver will have to drive the vehicle while watching around the left and right sides of the road 221.

Consequently, according to the fourth embodiment of the invention, attention is riveted to the point above in order to prevent the image picked up by the camera 201 from being unnecessarily displayed, whereupon it has been so arranged as to decide whether or not the display of the picked-up image will be needed by taking into consideration the travel condition of the vehicle (vehicle speed in this case).

At Step S4, the image picked up by the camera 201 is displayed on the display 203 and the next processing is performed. At Step S4, the image displayed on the display 203 is switched to the image picked up by the camera 203 in case where any other image such as a car navigation image or the like has been displayed on the display 203 at that point of time.

Therefore, as shownin FIG. 10, while the vehicle is traveling on the road 221 offering poor visibility on the left and right sides of the vehicle and it is coming near a T-shaped road offering poor visibility on the left and right sides of the vehicle, when the driver lowers the vehicle speed up to the reference speed or lower in an attempt to confirm the left and right directions of the T-shaped road, the contents of display on the display 203 are automatically switched. As shown in FIG. 10, an image resulting from picking up an area ranging from 213 to 215 in the lateral direction of the T-shaped road is to be displayed on the display 203.

At Step S5, it is decided whether or not the image picked up by the camera 201 has been displayed on the display 203 and in case where it has been displayed, Step S6 is followed. In case where it has not been displayed, the next processing is performed. At Step S6, the preceding image displayed by the display 203 is displayed on the display 203 before the image picked up by the camera 201 is displayed on the display 203 and the next processing is performed.

As described above, the control unit 211 controls the contents of display on the display 203 by repeating the processing from Step S1 up to Step S6 at high speed.

As set forth above, according to the fourth embodiment of the invention, the display of images around the vehicle on the display 203 is decided to be necessary only when the width of the road 221 during the travel of the vehicle has the predetermined reference distance or less and only when the vehicle speed is the reference speed or lower, and the images around the vehicle are displayed on the display 203. Accordingly, only in case where the width of the road 221 is narrow and where the driver lowers the vehicle speed in order to watch around the vehicle, the images around the vehicle are allowed to be displayed on the display 203. Thus, the display of images around the vehicle can be made automatically and precisely with a low-cost construction in proportion to a visual field over the surroundings of a road and the travel conditions of the vehicle. As a result, images around the vehicle are prevented from being displayed in any useless place, which also prevents the interruption of driving.

As the camera 201 is installed in the front end portion of the vehicle and adapted to pick up the images in left and right directions in front of the vehicle, the left and right sides can precisely be confirmed at cross-shaped and T-shaped intersections by reference to the images picked up by the camera 201.

Although the travel-condition detecting portion 207 is to accept the vehicle speed signal as the vehicle signal so as to detect the vehicle speed according to the fourth embodiment of the invention, the travel-condition detecting portion 207 may be used to detect whether or not the brake is actuated by inputting thereto the brake signal indicating the actuation of the brake as the vehicle signal.

In this case, the control unit 211 is set to decide that the display of the image picked up by the camera 201 on the display 203 will be needed and to turn on the display 203 so as to display the image picked up by the camera 201 only in case where the width of the road 21 detected via the distance measuring sensor 205 is equal to the predetermined reference distance or less; the actuation of the brake is detected by the travel-condition detecting portion 207; and the vehicle speed detected by the travel-condition detecting portion 207 is the predetermined reference speed (e.g., 10 km/h) or lower.

As a variation of the invention, further, a change over switch may be provided, so that switching the on and off states of the display of the image picked up by the camera 201 on the display 203 is conducted manually. By operating the change over switch, switching the on and off states of the display of the image picked up by the camera 201 on the display 203 may be conducted, irrespective of the decision on whether or not the display of the image picked up by the camera 201 on the part of the control unit 211.

The apparatus for watching around the vehicle according to the invention includes the light-to-dark decision unit for deciding the lightness outside the vehicle; the display color of the mask image is switchable from one to another; and the display color of the mask image is set switchable from one to another according to the light-to-dark decision signal from the light-to-dark decision unit, whereby the boundary between the picked-up images and the mask image can clearly be recognized; the advantage is that this contributes to improving the visibility.

The apparatus for watching around a vehicle according to the invention functions as what picks up images of both left and right surroundings of the vehicle, causing the left and right images thus picked up to be displayed on the display unit separately or simultaneously; the advantage is that the picked-up left image can easily be distinguished from the right image by the mask image in a manner specifying the left or right image.

The apparatus for watching around a vehicle according to the invention is such that a plurality of colors including light and dark colors are provided as the display color of the mask image and wherein the display color of the mask image is switched to the dark color when the luminous intensity outside the vehicle is decided to be high through the light-to-dark decision signal, and to the light color when the luminous intensity outside the vehicle is decided to be low therethrough, so that the boundary between the picked-up left and right images and the mask image can clearly be recognized and this results in improving the visibility.

In the apparatus for watching around a vehicle, the light-to-dark decision unit has the lamp lighting circuit mounted on the vehicle and the light-to-dark decision signal includes the light-on and light-off signals of the lamp lighting circuit ,thereby to switch the display colors of the mask image when the luminous intensity outside the vehicle is decided to be high by the light-off signal or when the luminous intensity outside the vehicle is decided to be low by the light-on signal.

Thus, the boundary between the picked-up images and the mask image can clearly be recognized, irrespective of the lightness outside the vehicle. Therefore, the advantage is that not only improvement in the visibility but also structural simplification is achievable.

As set forth above, in the apparatus for watching around a vehicle, the image control unit comprises an image pick-up element power switch for turning on and off the operating circuit of the image pick-up element, an image output signal switch for turning on and off an image output circuit for subjecting an image signal picked up by the image pick-up element to a conversion process and supplying the converted image signal, and a switch control portion having the upper threshold speed of vehicle speed for turning on and off the image pick-up element power switch and a lower threshold speed of the vehicle speed for turning on and off the image output signal switch and wherein the image pick-up element power switch may be turned on by the switch control portion when it is detected that the vehicle speed reaches the upper threshold speed during the time of speed reduction and the image output signal switch is turned on by the switch control portion when it is detected that the vehicle speed reaches the lower threshold speed during the time of speed reduction. As the images are supplied to the display unit in such a state that the operation of the image pick-up element is stabilized in this system, the advantage is that the display of a noise image in the display unit is effectively prevented, whereby display quality is made improvable.

As the image pick-up element power switch as well as the image output signal switch is turned off by the switch control portion when it is detected that the vehicle speed reaches the lower threshold speed, the advantage is that it is possible to achieve power saving effectively.

As the image control unit includes the display unit power switch for turning on and off the operating circuit of the display unit simultaneously with the display unit power switch and the image pick-up element power switch being turned on and off in synchronization with each other by the switch control, portion, the advantage is that it is possible to achieve larger power saving.

According to the invention, the apparatus for watching around a vehicle is provided with the distance measuring unit for detecting the distance between the vehicle and the obstacle so positioned as to obstruct the view of the driver on at least one side out of both sides of the vehicle during the travel of the vehicle, and the controller for deciding whether or not the display of the image on the display unit will be needed on the basis of the distance detected by the distance measuring unit and controlling the display unit over switching the on and off states of display according to the decision made thereby. Thus, the display of images around the vehicle can be made automatically and precisely with a low-cost construction in proportion to a visual field over the surroundings of a road and the travel conditions of the vehicle. As a result, images around the vehicle are prevented from being displayed in any useless place, which also prevents the interruption of driving.

According to the invention, switching the on and off states of the display of images around the vehicle can be conducted precisely in proportion to the width of a road in the urban area where buildings and the like are erected close to both sides of the road.

Since how much the driver feels the necessity of visibility around the vehicle is typically represented by the vehicle speed and the variation of the vehicle speed (i.e., speed is reduced when visibility of the surroundings is needed), the controller is made to decide whether or not the display of the image on the display unit will be needed on the basis of the width of the road detected by the distance measuring unit and the result detected by the travel-condition detector, and able to control the display unit over switching the on and off states of display by taking into consideration the visibility around the road and the necessity of visibility around the vehicle that the driver desires.

According to the invention, since the display of the image by the display unit is decided to be necessary only in case where the width of the road detected by the distance measuring unit is equal to the predetermined reference distance or less and where the vehicle speed detected by the travel-condition detector is the predetermined reference speed or lower, the image around the vehicle is displayed on the display unit. Therefore, the image around the vehicle can be displayed on the display unit only when the width of the road is narrow and when the driver lowers the vehicle speed so as to watch around the vehicle.

Since the image pick-up unit is installed in the front end portion of the vehicle and used to pick up images in left and right directions in front of the vehicle, the left and right sides can precisely be confirmed at cross-shaped and T-shaped intersections by reference to the images picked up by the camera.

What is claimed is:

1. An apparatus for watching around a vehicle, the apparatus comprising:

an image pick-up unit, mounted on an exterior of the vehicle, for picking up images of the surroundings of the vehicle;

a display unit, provided within the vehicle, for displaying the images with a mask image superimposed on the images;

a light-to-dark decision unit for deciding lightness outside the vehicle and outputting a light-to-dark decision signal;

wherein a display color of the mask image is switchable from one to another; and the display color of the mask image is set switchable from one to another according to the light-to-dark decision signal from the light-to-dark decision unit, wherein a plurality of colors including light and dark colors are provided as the display color of the mask image; and the display color of the mask image is switched to the dark color when the luminous intensity outside the vehicle is decided to be high based on the light-to-dark decision signal, and to the light color when the luminous intensity outside the vehicle is decided to be low based thereon.

2. The apparatus as claimed in claim 1, wherein the image pick-up unit picks up both left and right surroundings of the vehicle to obtain left and right images;

the display unit separately or simultaneously displays the left and right images; and the display unit displays the mask image to specify the left and right images.

3. The apparatus as claimed in claim 1, wherein the light-to-dark decision unit has a lamp lighting circuit mounted on the vehicle, wherein the light-to-dark decision signal includes a light-on and a light-off signal of the lamp lighting circuit to switch the display color of the mask image when the luminous intensity outside the vehicle is decided to be high by the light-off signal or when the luminous intensity outside the vehicle is decided to be low by the light-on signal.

4. An apparatus for watching around a vehicle, the apparatus comprising:

an image pick-up unit mounted to the vehicle, the image pick-up unit for picking up an image on both left and right sides of the surroundings of the vehicle;

a display unit provided within the vehicle, the display unit for displaying the image on the left and right side, an image control unit including:

an image pick-up unit power switch for turning on and off an operating circuit of the image pick-up unit;

an image output signal switch for turning on and off an image output circuit for converting the image signal from said image pick-up unit and supplying the image signal converted; and a switch control portion having an upper threshold speed of a vehicle speed for turning on and off the image pick-up unit power switch and a lower threshold speed of the vehicle speed for turning on and off the image output signal switch, wherein the switch control portion turns on the image pick-up unit power switch when it is detected that the vehicle speed reaches the upper threshold speed while the vehicle speed reduces; and the switch control portion turns on the image output signal switch when it is detected that the vehicle speed reaches the lower threshold speed when the vehicle speed reduces.

5. The apparatus as claimed in claim 4, wherein the switch control portion turns off the image pick-up unit power switch and the image output signal switch when it is detected that the vehicle speed reaches the lower threshold speed when the vehicle speed increases.

6. The apparatus as claimed in claim 4, wherein the image control unit including a display unit power switch for turning on and off an operating circuit of the display unit, wherein the switch control portion turns on and off the display unit power switch and the image pick-up element power switch in synchronization with each other.

7. An apparatus for watching around a vehicle, said apparatus comprising:

an image pick-up unit for picking up an image of a dead angle area around the vehicle;

a display unit for displaying the image from the image pick-up unit;

a distance measuring unit for detecting a distance between the vehicle and each obstacle located to obstruct a view of a driver on at least one side out of both sides of the vehicle during the travel of the vehicle; and a controller for deciding whether or not the image on the display unit is to be displayed on the basis of the distance detected by the distance measuring unit, the controller for controlling the display unit to turn on or off the image of the obstacle on the display unit according to the decision.

8. The apparatus as claimed in claim 7, wherein the distance measuring unit detects the distance between the vehicle and each of the obstacles located on each of the left and right sides of the vehicle during the travel of the vehicle; and the controller detects a space between the left-hand and right-hand obstacles on the basis of the distance between the vehicle and each of the left-hand and right-hand obstacles detected by the distance measuring unit, regards the space as width of a road on which the vehicle is traveling, decides whether or not the image on the display unit is to be displayed on the basis of the value of the width thereof, and controls the display unit to turn on or off the image of the obstacle on the display unit according to the decision.

9. The apparatus as claimed in claim 8, further comprising a travel-condition detector for accepting at least one vehicle signal for making a reduced vehicle speed detectable in vehicle signals indicating travel conditions which are output from a plurality of vehicle portions, and detecting the reduced vehicle speed according to the one vehicle signal, wherein the controller decides whether or not the display of the image on the display unit is to be needed on the basis of the width of the road detected by the distance measuring unit and the result detected by the travel-condition detector, and controls the display unit to turn on or off the image of the obstacle on the display unit according to the decision.

10. An apparatus for watching around a vehicle as claimed in claim 8, further comprising a travel-condition detector for detecting vehicle speed by accepting a vehicle signal indicating a vehicle speed, wherein the controller decides that the display of the image by the display unit is to be needed only in case where the width of the road detected by the distance measuring unit is equal to a predetermined reference distance or less and where the vehicle speed detected by the travel-condition detector is a predetermined reference speed or lower, and causes the image to be displayed on the display unit.

11. The apparatus for watching around a vehicle as claimed in claim 7, wherein the image pick-up unit is installed in the front end portion of the vehicle and used to pick up the image in left and right directions in front of the vehicle.

* * * * *